United States Patent
Majors et al.

(10) Patent No.: US 9,915,266 B2
(45) Date of Patent: Mar. 13, 2018

(54) BOOT SEAL RETAINER SYSTEMS AND METHODS

(71) Applicant: Baker Hughes Incorporated, Houston, TX (US)

(72) Inventors: Matthew T. Majors, Collinsville, OK (US); Chris J. Layton, Claremore, OK (US); Jeffrey G. Frey, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 860 days.

(21) Appl. No.: 14/335,527

(22) Filed: Jul. 18, 2014

(65) Prior Publication Data

US 2015/0023822 A1 Jan. 22, 2015

Related U.S. Application Data

(60) Provisional application No. 61/847,888, filed on Jul. 18, 2013.

(51) Int. Cl.

| | | |
|---|---|---|
| *F02D 13/06* | (2006.01) | |
| *H02G 15/013* | (2006.01) | |
| *F04D 29/06* | (2006.01) | |
| *F16L 5/10* | (2006.01) | |
| *F04D 13/10* | (2006.01) | |
| *F04D 29/08* | (2006.01) | |
| *F04D 13/06* | (2006.01) | |
| *H02G 3/06* | (2006.01) | |
| *H02G 3/22* | (2006.01) | |

(52) U.S. Cl.
CPC ......... *F04D 13/0693* (2013.01); *F04D 13/10* (2013.01); *F04D 29/086* (2013.01); *F16L 5/10* (2013.01); *H02G 3/0675* (2013.01); *H02G 3/22* (2013.01); *H02G 15/013* (2013.01)

(58) Field of Classification Search
CPC .... F04D 13/0693; F04D 13/10; F04D 29/086; F16L 5/10; H02G 15/013; H02G 3/0675; H02G 3/22
USPC .......................................................... 310/87
See application file for complete search history.

(56) References Cited

U.S. PATENT DOCUMENTS

| | | | | |
|---|---|---|---|---|
| 3,187,088 A | * | 6/1965 | Warner ................. | H02G 15/24 174/76 |
| 4,157,022 A | * | 6/1979 | Crase ..................... | E21B 4/003 464/11 |
| 4,614,392 A | * | 9/1986 | Moore ............... | H01R 13/5213 174/91 |
| 4,797,117 A | * | 1/1989 | Ayers .................. | H01R 13/523 439/200 |

(Continued)

*Primary Examiner* — Alex W Mok
(74) *Attorney, Agent, or Firm* — Law Offices of Mark L. Berrier

(57) ABSTRACT

Systems and methods for providing seals around the motor leads and other conductors in ESP's. In one embodiment, elastomeric boot seals are positioned within annular spaces around motor leads in an ESP motor. When the motor is filled with dielectric oil, the elastomeric material of the boot seals absorbs some of the oil and swells. High temperatures may also cause the material of the seals to expand. Retainers which are not subject to swelling are positioned around the boot seals, thereby preventing the boot seals from expanding away from the leads. The retainers thereby maintain the seal of the boot seals against the motor leads.

20 Claims, 4 Drawing Sheets

(56) References Cited

U.S. PATENT DOCUMENTS

| | | | | |
|---|---|---|---|---|
| 5,286,220 A * | 2/1994 | Watson | | H01R 13/523 439/276 |
| 5,478,970 A * | 12/1995 | Lawler | | E21B 17/023 174/74 R |
| 5,553,902 A * | 9/1996 | Powers | | F16L 19/0212 285/331 |
| 5,567,170 A * | 10/1996 | Kroeber | | H01R 13/533 439/186 |
| 5,645,442 A * | 7/1997 | Cairns | | H01R 13/523 439/201 |
| 5,975,949 A * | 11/1999 | Holliday | | H01R 9/0518 439/585 |
| 6,321,021 B1 * | 11/2001 | Cairns | | G02B 6/4428 385/135 |
| 6,361,342 B1 * | 3/2002 | Cox | | H01R 13/5205 277/615 |
| 6,899,532 B2 * | 5/2005 | Eddy | | H01R 13/5219 310/71 |
| 7,101,217 B2 * | 9/2006 | Hayashi | | H01R 13/6592 439/447 |
| 7,207,840 B2 * | 4/2007 | Fukushima | | H01R 13/5221 439/589 |
| 7,208,855 B1 * | 4/2007 | Floyd | | E21B 43/128 166/66.4 |
| 8,502,075 B2 * | 8/2013 | Emerson | | E21B 17/028 174/88 R |
| 2003/0156947 A1 * | 8/2003 | Gross | | E21B 43/128 417/53 |
| 2003/0190243 A1 * | 10/2003 | Eddy | | H01R 13/5219 417/423.3 |
| 2008/0064269 A1 * | 3/2008 | Parmeter | | H01R 13/521 439/733.1 |
| 2009/0269956 A1 * | 10/2009 | Frey | | H01R 13/523 439/275 |
| 2010/0065302 A1 * | 3/2010 | Nesbitt | | E21B 17/028 174/116 |
| 2010/0156215 A1 * | 6/2010 | Goertzen | | H02K 5/132 310/87 |
| 2012/0052721 A1 * | 3/2012 | Watson | | E21B 17/025 439/519 |
| 2012/0063934 A1 * | 3/2012 | Rumbaugh | | F04B 47/06 417/410.1 |
| 2012/0093666 A1 * | 4/2012 | Knapp | | H02K 3/38 417/410.1 |
| 2012/0100737 A1 * | 4/2012 | Frey | | H01R 13/523 439/271 |
| 2012/0223603 A1 * | 9/2012 | Knapp | | H02K 5/132 310/71 |
| 2014/0159536 A1 * | 6/2014 | Flett | | F04D 13/10 310/184 |

* cited by examiner

BOOT SEAL RETAINER SYSTEMS AND METHODS

BACKGROUND

Field of the Invention

The invention relates generally to power subsystems for downhole equipment such as electrical submersible pumps (ESP's), and more particularly to means for improving the effectiveness of sealing components in downhole equipment that are exposed to high temperatures and dielectric oils.

Related Art

Downhole equipment such as ESP systems are commonly installed in wells for purposes of producing fluids (e.g., oil) from the wells. Power suitable to drive the equipment is produced at the surface of the wells and is delivered to the equipment via power cables that extend into the wells. The power cables may have one or more electrical junctions, such as splices to motor leads and "pothead" connectors that couple the power cable to the downhole equipment.

The motor of an electric submersible pump is commonly connected to the power cable through a pothead connection. The motor typically has one or more terminals which extend through an insulating block in the motor housing so that a pothead connector can be coupled to the terminals. On the interior of the motor, the terminals are connected to leads which are in turn connected to the windings of the motor.

The interior of the motor is often filled with dielectric oil. This oil has lubricating, cooling and electrically insulating properties. Insulating boots are usually installed around the motor leads at the interior end of the insulating block. These boots provide a seal around the leads and prevent particles which are suspended in the oil from getting between the motor leads and the insulating block. The boots, however, are made of elastomeric materials that typically swell when exposed to the dielectric oil, resulting in gaps between the boots and the motor leads which impairs their functionality.

It would be desirable to provide improved means for manufacturing and installing boot-type seals so that the problems associated with swelling of the elastomeric seals are reduced or avoided.

SUMMARY OF THE INVENTION

Embodiments of the present invention include systems and methods for sealing around the motor leads and other conductors, wherein elastomeric boot seals are positioned within annular spaces, and retainers which are not subject to swelling resulting from exposure to the electric oil are positioned around or within the boot seals to prevent dimensional changes in the boot seals which would otherwise result in gaps between the boots and corresponding sealing surfaces.

In one embodiment, an improved boot seal for use in downhole equipment is provided. In this embodiment, an annular boot seal is made of elastomeric material. The boot seal is configured to fit around an insulated conductor, so that the inner diameter of the boot seal fits snugly against the insulated conductor. The outer diameter of the boot seal is configured to fit snugly within an opening in a housing of the downhole equipment. A groove is provided in the outer diameter of the boot seal to accommodate a boot seal retainer. The boot seal retainer is made of a material that does not significantly expand when exposed to dielectric oil at high temperatures. When the boot seal is installed in a piece of downhole equipment and the equipment is operated, the elastomeric material of the seal may swell, but the boot seal retainer will provide hoop strength that prevents the inner diameter of the boot seal from expanding and leaving a gap between the boot seal and the insulated conductor around which it is installed.

In an alternative embodiment, a motor for an ESP system is configured to enable a pothead connector to be attached to the motor. The motor housing includes a head portion that accommodates an insulation block in which a set of terminals are installed. The terminals are connected to motor leads that extend into the interior of the motor. On the interior side of the insulation block, an annular elastomeric boot seal is installed around each of the motor leads. An annular boot seal retainer is positioned around the boot seal to prevent the inner diameter of the boot seal from expanding away from the outer diameter of the motor lead when the elastomeric material of the boot seal swells from exposure to dielectric oil in the motor.

Another alternative embodiment may comprise installing one or more elastomeric boot seals around insulated conductors in a motor for an ESP system, and installing boot seal retainers around each of the boot seals. The motor is then filled with dielectric oil and operated, wherein when the elastomeric material of the boot seals swells from exposure to dielectric oil in the motor at high temperatures, the boot seal retainers prevent the boot seals from expanding away from the insulated conductors.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
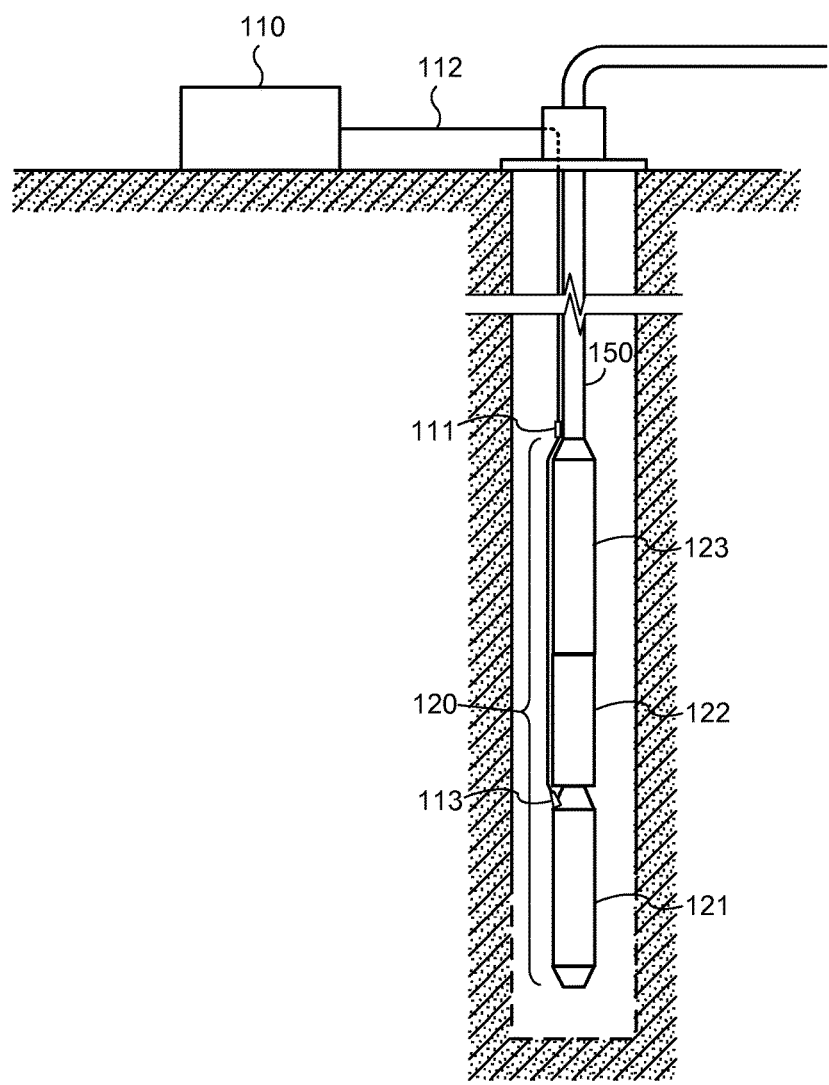
FIG. 1 is a diagram illustrating an exemplary ESP system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein.

DESCRIPTION OF EXEMPLARY EMBODIMENTS

One or more embodiments of the invention are described below. It should be noted that these and any other embodiments described below are exemplary and are intended to be illustrative of the invention rather than limiting.

In one embodiment, a motor for an ESP system is configured to enable a pothead connector to be attached to the motor, thereby providing an electrical path for power to be supplied to the motor. The motor housing includes a head portion that is configured to accommodate an insulation block. The insulation block has a set of terminals installed therein which are configured to mate with corresponding terminals of a pothead connector. The terminals are connected to motor leads that extend to the windings of the stator within the motor housing. On the interior side of the insulation block (the side exposed to the interior of the motor housing), an elastomeric boot seal is installed around each of the motor leads. Each boot seal is generally annular, and is positioned in a gap between the corresponding motor lead and the insulation block. An annular boot seal retainer is positioned around the boot seal to prevent the inner diameter of the boot seal from expanding away from the outer diameter of the motor lead.

Referring to FIG. 1, a diagram illustrating an exemplary ESP system in which one embodiment of the present invention may be installed is shown. In this embodiment, an ESP system is installed in a well for the purpose of producing oil, gas or other fluids. An ESP 120 is coupled to the end of tubing string 150, and the ESP and tubing string are lowered into the wellbore to position the ESP in a producing portion of the well (as indicated by the dashed lines at the bottom of the wellbore). Surface equipment that includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

ESP 120 includes a motor section 121, seal section 122, and pump section 123. ESP 120 may include various other components. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112.

Power cable 112 extends downward along the tubing string from the drive unit at the surface of the well to a point near the ESP. At this point (typically 10-50 feet above the ESP), the primary cable is connected to the motor lead by a splice 111. The motor lead extends from the primary cable to the motor, and is connected to the motor by a pothead connector 113. Pothead connector 113 is mated with a set of power terminals of the motor, and the pothead connector is secured to the motor housing.

Figure 2:
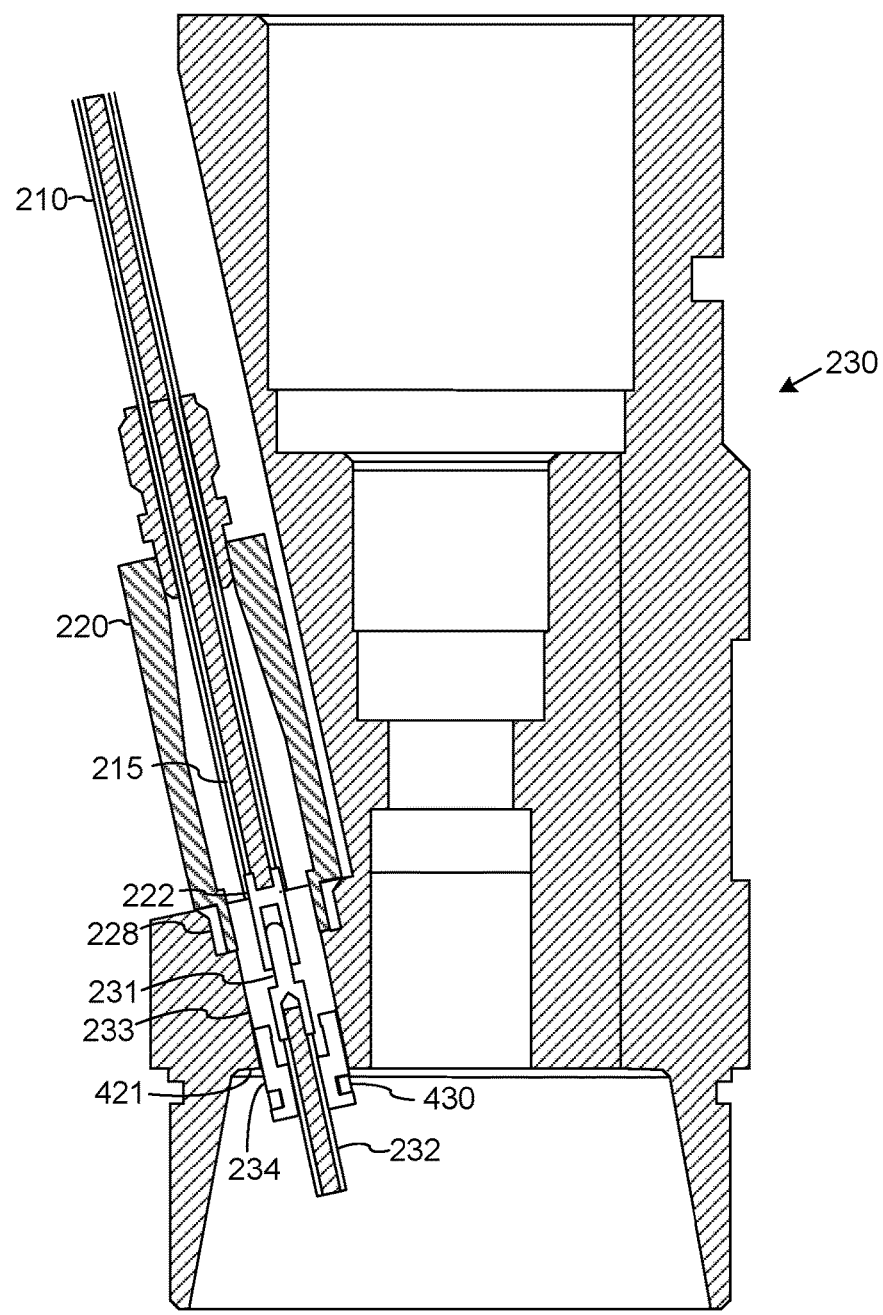
FIG. 2 is a diagram illustrating the structure of a pothead connection at the top of an ESP motor in accordance with one embodiment.

Referring to FIG. 2, a cutaway view of the motor at the pothead connection is shown. The illustrated structures are exemplary, and may differ from one embodiment to another. In this embodiment, motor lead 210 is coupled to pothead connector 220, which is secured to motor head 230. A single one of the conductors of motor lead 210 is depicted in the figure.

The insulated conductor 215 passes through the body of pothead connector 220 and is connected to a conductive female terminal 222, which is positioned at a lower or motor end of the pothead connector. Female terminal 222 is configured to mate with a male terminal 231, which is installed in an insulating block 233 which is installed in motor head 230. Male terminal 231 is electrically coupled to internal motor lead 232 of the motor. A boot seal 234 is installed around motor lead 232 in a gap between insulating block 233 and motor head 230.

Figure 3:
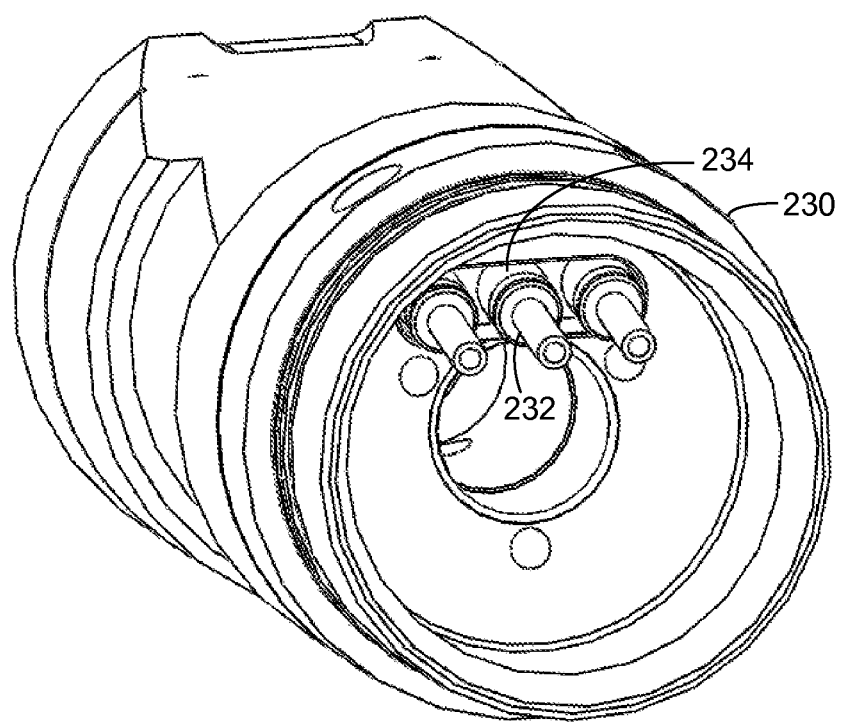
FIG. 3 is a perspective view of the interior of a motor head showing boot seals with boot seal retainers installed around motor leads from the pothead connection.

Referring to FIG. 3, a perspective view of the interior of the motor head is shown. Motor head 230 is viewed from the lower end, and is shown disconnected from the remainder of the motor housing. It can be seen in this figure that the three motor leads (e.g., 232) extend from insulating block 233 into the interior of motor head 230. Each of the motor leads (e.g., 232) has a corresponding boot seal (e.g., 234) installed around it, between the motor lead and motor head 230.

Figure 4:
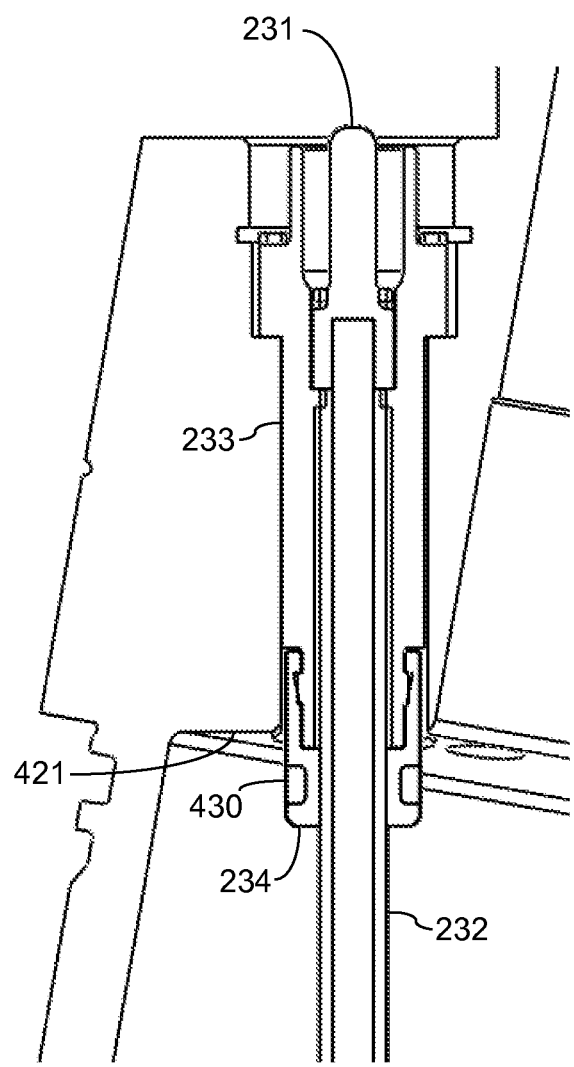
FIG. 4 is a cross-sectional view of the structure of the male terminal assembly of the pothead connection of the motor head.

Referring to FIG. 4, a cross-sectional view of the structure of the terminal assembly is shown in more detail. As noted above, insulation block 233 is installed in an opening in motor head 230. An annular external seal 228 is positioned between insulation block 233 and motor head 230 at the exterior of the motor head. Boot seal 234 is installed at the interior of the motor head. Boot seal 234 is positioned around insulated conductor 232 and extends between insulation block 233 and motor head 230.

The interior (420) of the motor is filled with dielectric oil. As the motor is operated, the presence of the dielectric oil and the elevated temperatures within the motor cause some of the oil to be absorbed by the elastomeric material of boot seal 234, which results in swelling of the elastomeric material. In conventional systems, the swelling of the elastomeric material causes the inner diameter of the boot seal to increase. Because the outer diameter of insulated conductor 232 does not expand in the same manner as the boot seal, the swelling of the boot seal can create a gap between the boot seal and the insulated conductor, allowing the dielectric oil and particles within the oil to get between the boot seal and the insulated conductor. This can cause increased wear and degradation of the insulation around the conductor, which reduces the effective lifetime of the motor.

In the present systems and methods, a boot seal retainer is provided to prevent the boot seal from expanding outward, away from the insulated conductor. In the embodiment of FIG. 4, an annular boot seal retainer 430 is installed around the portion of the boot seal that extends beyond the interior surface 421 of the motor head. In this case, boot seal 234 extends approximately ½ to 1 inch into the interior of the motor head from surface 421. A groove is provided on the exterior of boot seal 234 to accommodate boot seal retainer 430. In alternative embodiments, boot seal retainer 430 may be formed integrally with boot seal 234.

Boot seal retainer 430 is made of a material that does not swell or expand significantly in the presence of the dielectric oil and high temperatures within the motor. Boot seal retainer 430 provides increased hoop strength to boot seal 234. In one embodiment, boot seal retainer 430 is made of a substantially rigid plastic, but other materials may be used in alternative embodiments.

Because boot seal retainer 430 does not expand to a significant degree, it constrains the expansion of boot seal 234 away from insulated conductor 232 and thereby prevents a gap from forming between these components. In fact, because the elastomeric material of boot seal 234 cannot expand outward, the swelling of the material actually causes the inner diameter of the boot seal to shrink (the material expands inward). By preventing a gap from forming between boot seal retainer 430 and the insulated conductor 232, the boot seal retainer helps to prevent debris in the dielectric oil from damaging the insulated conductor and/or insulation block 233.

As noted above, the foregoing embodiments are exemplary, and there may be many alternative embodiments of present invention. The alternative embodiments may have variations of the features described above. For instance, while the boot seals and retainers described above are installed in an ESP motor, they may be installed in other types of equipment as well. The boot seals and retainers may be installed around individual leads or groups of leads/conductors. Similarly, the steps of the methods disclosed herein may be varied (e.g., performed in an alternative order) in alternative embodiments. Numerous other variations may be made in other embodiments.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A system comprising:
    an electric submersible pump (ESP) motor having a motor housing with a stator therein, wherein the motor housing has an aperture therethrough and wherein an insulating block is positioned within the aperture and is contacting the motor housing; and
    one or more connectors that couple power conductors external to the motor housing to stator winding leads internal to the motor housing;
    wherein each of the one or more connectors includes a terminal to which a corresponding one of the stator winding leads is connected, wherein the terminal is positioned within the insulating block that electrically isolates the terminal from the motor housing, wherein an elastomeric boot seal is positioned at an end of the insulating block facing an interior of the motor housing around the stator winding lead adjacent to the terminal, wherein the elastomeric boot seal provides a seal between the motor housing and the stator winding leads and thereby prevents fluid communication between the interior of the motor housing where the stator is located and the insulating block, wherein a boot seal retainer is positioned around the boot seal and prevents expansion of the boot seal away from the stator winding lead.

2. The system of claim 1, wherein a first portion of the boot seal is positioned within an aperture in the motor housing and a second portion of the boot seal extends from the aperture into the interior of the motor housing, wherein the boot seal retainer is positioned around the second portion of the boot seal.

3. The system of claim 1, wherein the boot seal retainer comprises a rigid plastic.

4. The system of claim 1, wherein the boot seal retainer comprises a ring, wherein the boot seal has a groove in an outer periphery thereof, wherein the boot seal retainer is positioned within the groove.

5. The system of claim 4, wherein an outer diameter of the boot seal retainer is no greater than an outer diameter of the boot seal.

6. The system of claim 1, wherein the motor housing is filled with dielectric oil.

7. The system of claim 6, wherein the boot seal retainer is does not absorb the dielectric oil.

8. The system of claim 1, wherein the one or more connectors comprise pothead connectors.

9. The system of claim 1, wherein the boot seal prevents dielectric oil that fills the interior of the motor housing from reaching the insulating block.

10. The system of claim 1, wherein the ESP motor is positioned downhole in a well, wherein the system further comprises an electric drive positioned at the surface of a well and a power cable that electrically couples the electric drive to the ESP motor via the one or more connectors.

11. The system of claim 1, wherein at least a portion of the boot seal surrounds a corresponding portion of the insulating block and provides a seal between the insulating block and the motor housing.

12. A boot seal comprising:
    an annular elastomeric seal portion; and
    an annular retainer portion;
    wherein the seal portion has an aperture therethrough, and wherein the aperture forms an inner diameter that provides a sealing surface against for sealing against a conductor that is positioned through the aperture;
    wherein the retainer portion is positioned within a groove around an outer periphery of the seal portion and thereby prevents expansion of the seal portion; and
    wherein an outer diameter of the retainer portion is no greater than an outer diameter of the seal portion.

13. The boot seal of claim 12, wherein the retainer portion comprises a ring.

14. The boot seal of claim 12, wherein when the boot seal is in contact with dielectric oil, the seal portion absorbs a portion of the dielectric oil and swells, but the retainer portion does not absorb the dielectric oil.

15. The boot seal of claim 12, wherein the retainer portion comprises a rigid plastic.

16. A method for sealing an electrical connection through a motor housing, the method comprising:
    providing a housing for an electric submersible pump (ESP) motor with a stator therein, wherein the motor housing has an aperture therethrough;
    inserting an insulation block in the aperture, wherein the insulation block contacts the motor housing;
    inserting one or more terminals in the insulation block;
    connecting each of the one or more terminals to a corresponding stator winding lead;
    positioning an elastomeric boot seal around each stator winding lead adjacent to the corresponding terminal and at an end of the insulating block facing an interior of the motor housing, thereby providing a first seal between the motor housing and the corresponding stator winding lead which prevents fluid communication between the interior of the motor housing where the stator is located and the insulating block, wherein a boot seal retainer is positioned around the boot seal, thereby preventing expansion of the boot seal away from the stator winding lead; and
    filling the motor housing with dielectric oil.

17. The method of claim 16, wherein positioning the elastomeric boot seal around each stator winding lead comprises positioning the boot seal with a first portion of the boot seal within the aperture in the motor housing and a second portion of the boot seal extending from the aperture into the interior of the motor housing, wherein the boot seal retainer is positioned around the second portion of the boot seal.

18. The method of claim 16, further comprising connecting each of the one or more terminals to a corresponding power conductor external to the motor housing.

19. The method of claim 18, wherein connecting each of the one or more terminals to a corresponding power conductor external to the motor housing comprises providing a pothead connector that is connected to the external power conductors and securing the pothead connector to the motor housing.

20. The method of claim 16, further comprising positioning the elastomeric boot seal around each stator winding lead with at least a portion of the boot seal surrounding a corresponding portion of the insulation block and providing a second seal between the insulation block and the motor housing.

\* \* \* \* \*